May 9, 1933.  G. E. SEDGLEY ET AL  1,907,593
METHOD OF MAKING A BELT
Filed March 22, 1930
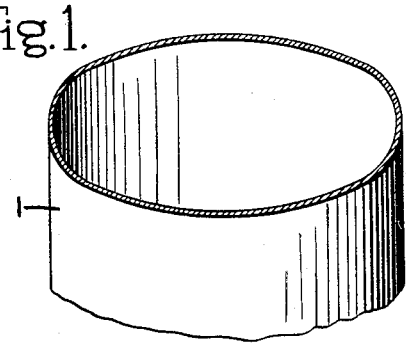
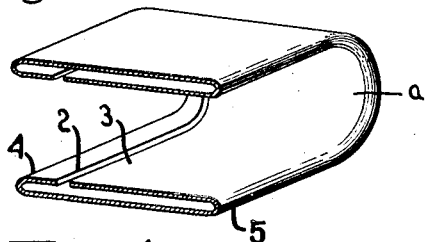
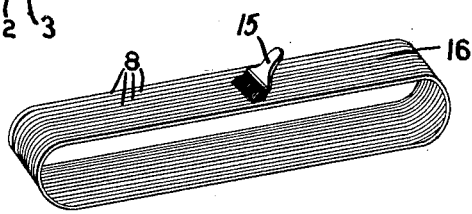
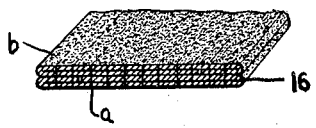
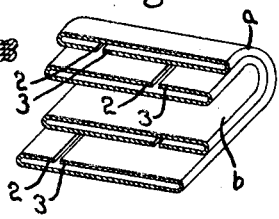
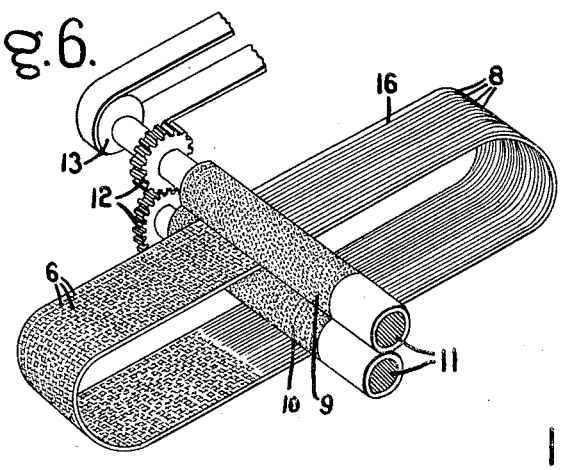
Inventors.
Gertrude Sedgley
Ludovic Shiatte
Arthur S. Brown
by Heard Smith & Tennant.
Attys.

Patented May 9, 1933

1,907,593

UNITED STATES PATENT OFFICE

GERTRUDE E. SEDGLEY, LUDOVIC SHIATTE, AND ARTHUR S. BROWN, OF TILTON, NEW HAMPSHIRE

METHOD OF MAKING A BELT

Application filed March 22, 1930. Serial No. 438,074.

This invention relates to the manufacture of power transmission belts of the type which comprise a plurality of plies of fabric stitched together by stitching running lengthwise of the belt.

A belt which is made in this way is apt to present a ribbed surface because in stitching the belt the stitches are drawn tight and tend to condense the plies of the fabric along the lines of stitching thus producing slight valleys or depressions in the belt where the rows of stitches are. This results in producing ribs between the rows of stitching, the ribs running longitudinally of the belt. The presence of such ribs tends to detract from the traction of the belt, and as the belt is used the ribs are subjected to the greatest wear thus causing the belt to wear unevenly.

It is an object of our invention to provide a novel process of making a belt of this type by which the completed or finished belt will present a substantially even traction surface which has better wearing qualities and greater traction than the ribbed surface above referred to.

While the invention is applicable to various types of transmission belts which are made with a plurality of plies of fabric sewed together yet we have illustrated it herein as it might be applied to an endless woven belt.

In the drawing:

Fig. 1 illustrates a fragmentary view of a section of tubular woven fabric from which a belt embodying the invention may be made;

Fig. 2 is a fragmentary sectional perspective view showing a section of tubular fabric partially folded;

Fig. 2ª is a sectional perspective view illustrating two sections of tubular fabric assembly ready to be stitched;

Fig. 3 is a sectional view illustrating two sections of tubular fabric assembled ready to be stitched;

Fig. 4 is an enlarged cross-sectional view showing the stitched belt;

Fig. 5 illustrates one way of applying a binder and filler material to the belt;

Fig. 6 is a perspective view illustrating the manner of treating the belt to eliminate the ribbed surface;

Fig. 7 is a sectional perspective view on a larger scale through the completed belt showing the character of the surfaces formed on the belt.

We have shown herein our improved method as applied to the making of endless belts from tubular surface fabric but the invention is equally applicable to belting which is to be made by sewing together different plies of fabric and which is intended to be sold by the foot. Where the belt is made from a tubular woven fabric the first operations are such as are now commonly employed in making endless belts from tubular fabric.

A plurality of sections are first cut from the tubular fabric and then the edges 2 and 3 of one section $a$ are folded inwardly as shown in Fig. 2 while the edges 2 and 3 of the other section $b$ are folded outwardly as shown in Fig. 2ª. The two folded sections are then assembled by placing the section $b$ within the section $a$ as shown in Fig. 3 thus making a four-ply belt. The two sections $a$ and $b$ are then stitched together by rows of stitching 6 which extend longitudinally of the belt, such stitching serving to unite the four plies of which the belt is made.

In running these rows or lines of stitching, the stitches in each row tend to compress the plies of fabric along the rows so that after the stitching is completed the belt presents slight valleys or depressions 7 on each face thereof where the rows of stitches occur, and between the rows of stitches the surface of the belt presents ribs or ridges 8 which extend longitudinally of the belt. The presence of these ribs or ridges 8 detracts somewhat from the tractive qualities of the belt because when the belt is in use it will bear on the pulleys along the ridges. Because of this the ridges will be subjected to the greatest wear as the belt is used, and as a result the belt surface will wear unevenly.

In order to eliminate this undesirable condition and to produce a belt of this type which has an even non-ribbed traction surface, the belt is first coated or saturated with a suitable binding or stiffening material and then is subjected to the action of a heated presser element having a roughened or knurled surface.

The coating or saturating of the belt may be accomplished either by immersing the belt in a suitable impregnating liquid or by painting liquid on the belt by means of a brush 15 as shown in Fig. 5. While binding or stiffening materials of different kinds might be used we have secured excellent results by the use of casein.

After the belt has been thus treated with the stiffening material it is subjected to the action of a heated pressure element which preferably has knurled or roughened pressing surfaces of some suitable design.

While presser elements of various shapes may be used we prefer to use presser elements in the form of rolls as shown in Fig. 6. These rolls are indicated at 9 and 10 respectively and each is provided with a knurled or roughened surface of some suitable design. The rolls are heated rolls and the heat may be applied thereto in any approved way. One convenient way is to make each roll hollow and to insert in the roll an electric heating unit 11.

The rolls may also be driven in any approved way. As herein shown, the rolls are geared together by intermeshing gears 12 and one of the rolls is provided with a driving element 13 which may be in the form of a gear or a driving belt.

The action of the heated rolls tends to drive the casein into the body of the fabric, and the rolling pressure of the rolls flattens out the ribs 8 and fills up the valleys 7 so that as the belt emerges from the rolls it has a flat surface. As the knurled surface of the rolls passes over the surface of the belt, it sinks portions of some or all of the surface threads into the body of the fabric and produces a roughened surface on the belt having a design corresponding to that of the knurled surface of the rolls. The heat of the rolls dries the casein or other binder which then serves to hold the threads on the surface in the position given them by the roughened or knurled surface of the rolls. The flat roughened surface which is thus produced on the belt by its passage through the knurled rollers is preserved and any tendency of the fabric to resume the ribbed shape shown in Fig. 4 is obviated. The flat non-ribbed surface of the belt will thus be preserved during the use of the belt. Because of the flat nature of the traction surface of the belt the wear will be evenly distributed. The slight roughened surface which is given to the belt by the knurled surface of the rolls increases the tractive capacity of the belt and increases the efficiency of it as a power transmitting belt.

The rolls constitute rough-surfaced or knurled presser elements, and while we prefer to use presser elements of the roller type yet our invention is not limited thereto and presser elements of other shapes may be used without departing from the invention.

Another advantage which results from the above described method is that it eliminates the uneven spots in the belt which are frequently present at points which form the edges of the tubular fabric as it is woven. When a tubular fabric is woven on a loom the filling thread passes from the upper to the lower fabric at the end of each pick, and as the fabric is woven therefore, each filling thread will lie straight in the upper and lower fabrics and will make a turn around the edge of the fabric in passing one from the upper to the lower fabric. When a belt is made from a woven tubular fabric in the manner above described it sometimes happens that the portion of the belt which represents the edges of the tubular fabric will present slight bumps or humps which are sufficient to cause a noise or vibration in passing around a pulley when the belt is running very rapidly. The operation of passing the belt through the presser rolls as above described serves to iron out and smooth down any bumps or humps which the belt might have at these points thereby producing a belt which is uniform throughout and which can be run at a high speed without any tendency to vibrate.

While we have illustrated the invention as applied to an endless belt made from tubular fabric yet it will be obvious that it is equally applicable to other types of applying belting made by sewing together a plurality of plies of fabric.

We claim:

1. The method of making a belt which consists in forming a belt of a plurality of plies of fabric, stitching said plies together by lines of stitching running longitudinally of the belt thereby forming longitudinal ribs on the surface of the belt, impregnating the belt with a binding material which dries when subjected to heat and hardens as it dries, and before the binding material dries subjecting the wear face of the belt to the action of the heated pressing element having a knurled face whereby the heat of the pressing element dries the binding material and the knurled face of said element produces a roughened surface on the belt which is retained by the dried binding material.

2. The method of making a belt which consists in forming a belt of a plurality of plies of fabric, stitching said plies together by lines of stitching running longitudinally of the belt thereby forming longitudinal ribs on the surface of the belt, impregnating the belt with casein and before the casein dries passing the belt between heated cylindrical presser rollers having knurled surfaces whereby the heat of the rollers dries the casein and the knurled surface of the rollers produces a roughened surface on the belt which is retained by the dried casein.

3. The method of making a belt which consists in forming a belt of a plurality of plies of fabric, stitching said plies together by lines of stitching running longitudinally of the belt, impregnating the stitched belt with a binding material which dries when subjected to heat and hardens as it dries, subjecting the impregnated belt to the action of heat thereby to dry the binding material and simultaneously sinking into the body of the belt portions of the interwoven threads forming the surface plies of the belt, such sunken portions being retained in their sunken position by the dried binding material.

In testimony whereof we have signed our names to this specification.

GERTRUDE E. SEDGLEY.
LUDOVIC SHIATTE.
ARTHUR S. BROWN.